United States Patent [19]

Asoshina et al.

[11] Patent Number: 4,728,544
[45] Date of Patent: Mar. 1, 1988

[54] METHOD FOR COATING STEEL STRUCTURES IN WATER

[75] Inventors: Eishi Asoshina; Masato Shimizu; Kazufumi Hamabuchi, all of Osaka; Shunichi Hitoshi, Kanagawa; Kotaro Yoshida, Kanagawa; Kazuyuki Doi, Kanagawa, all of Japan

[73] Assignee: Nitto Electric Industrial Co., Ltd., Osaka, Japan

[21] Appl. No.: 880,430

[22] Filed: Jun. 30, 1986

[51] Int. Cl.$^4$ .............................................. B05D 3/02
[52] U.S. Cl. .................................. 427/407.3; 427/410
[58] Field of Search ............................ 427/410, 407.3

[56] References Cited

U.S. PATENT DOCUMENTS

T. 753,705  9/1969  Zimmt ........................ 427/410 X

FOREIGN PATENT DOCUMENTS 58-76465   5/1983  Japan .
59/062369  4/1984  Japan .................................. 427/410
7512036    4/1977  Netherlands ....................... 427/410
986064     3/1965  United Kingdom .

OTHER PUBLICATIONS

Abstract of Japan 60/075,366 published Apr. 1985.

Patents Abstracts of Japan, vol. 9, No. 237 (C-305) (1960), Sep. 24, 1985.
Patent Abstracts of Japan, vol. 5, No. 4 (C-38) (676) Jan. 13, 1981.

Primary Examiner—Thurman K. Page
Attorney, Agent, or Firm—Sughrue, Mion, Zinn, Macpeak, and Seas

[57] ABSTRACT

A method for coating steel structures in water which comprises
   coating as a first layer an underwater-curable composition comprising
      (1) a two-pack resin blend system comprising
         (a) a blend system comprising an epoxy-based resin, and
         (b) a blend system comprising an underwater-curable curing agent capable of hardening the epoxy-based resin blend system, and
      (2) from 5 to 75% by weight, based on the total weight of the underwater-curable composition, of a metal powder having an ionization tendency greater than that of iron,
on the steel structures, and
   coating an underwater-curable composition comprising the two-pack resin blend system and a coloring pigment on the first layer as a second layer.

8 Claims, No Drawings

METHOD FOR COATING STEEL STRUCTURES IN WATER

FIELD OF THE INVENTION

The present invention relates to a method for coating steel structures in water. More particularly, it is concerned with a method for coating in water, whereby corrosion and stain of steel structures placed in water or under humid conditions can be effectively prevented.

BACKGROUND OF THE INVENTION

In recent years, with development of the ocean, oil digging rig or steel structures such as oil storage purge and sea plant ships, piers of long bridges constructed in the sea, and steel structures in water of sea air ports have been increasingly constructed. These steel structures are substantially impossible to transmit to another place for the maintenance or corrosion repairing thereof, and such operations must be carried out under bad conditions such as in the sea or at a location where water is splashed. For this reason, it has been desired to develop a corrosion repairing method which can be easily carried out on or in the sea.

Japanese Patent Application (OPI) No. 137034/79, for example, discloses a coating method which can form a coating having excellent corrosion resistance on portions in water or splash zones of underwater structures in a simple and easy manner as on the ground (the term "OPI" as used herein refers to a "published unexamined Japanese patent application").

Conventional compositions for use in such underwater coating include a composition comprising an epoxy resin as a base resin, polyamide or polyamine as a curing agent and a filler as described in Japanese Patent Application (OPI) No. 67400/76. However, these conventional compositions have disadvantages that underwater coating properties are poor and coatings are quite easily lost by waves during hardening because of their poor adhesion force. Even if the coatings harden, the hardened coatings have poor adhesion properties and therefore anticorrosion over a long period of time cannot be expected.

SUMMARY OF THE INVENTION

As a result of extensive investigations to overcome the above problems, it has been found that in underwater coating of steel structures, if a paint containing a specific metal powder is coated as the first layer and a paint not containing the metal powder is then coated thereon as the second layer, a coating operation can be carried out in the sea in a simple manner as on the ground and a coating having excellent anticorrosion properties can be formed. Based on these findings, the present invention has been accomplished. In particular, it is a novel discovery that the adhesion properties of an epoxy resin to iron in water are greatly improved by using a metal powder in combination in the first layer-forming paint.

Accordingly, an object of the present invention is to provide a method for coating steel structures in water which comprising coating as a first layer an underwater-curable composition comprising
(1) a two-pack resin blend system comprising
(a) a blend system comprising an epoxy-based resin, and
(b) a blend system comprising an underwater-curable curing agent capable of hardening the epoxy-based resin blend systen, and
(2) from 5 to 75% by weight, based on the total weight of the underwater-curable composition, of a metal powder having an ionization tendency greater than that of iron,
on the steel structures, and
coating an underwater-curable composition comprising the two-pack resin blend systen and a coloring pigment on the first layer as a second layer.

DETAILED DESCRIPTION OF THE INVENTION

The term "epoxy-based resin" as used herein means both an epoxy resin and a mixed resin of an epoxy resin and other resin compatible therewith.

Of two blend systems which constitute the two-pack epoxy resin composition of the present invention, one blend system comprises an epoxy resin or a mixed resin of the epoxy resin and other resin compatible therewith. This blend system can contain additives such as a filler such as calcium carbonate, silica, talc and baryta; a flowability adjusting agent such as finely powdered silica and montmorillonite; and the like depending on the purpose of use. These additives are compounded in an amount up to 1,000 parts by weight, preferably 1 to 500 parts by weight, per 100 parts by weight of the epoxy resin or the mixed resin. In particular, a blend system having a relatively high viscosity can be formed by increasing the amount of the filler added.

The epoxy resin is preferably a bisphenol type epoxy resin. In addition, a cyclic aliphatic epoxy resin, a phenol or cresol novolak type epoxy resin, a glycidyl phthalate type epoxy resin, a $\beta$-methylepichlorohydrin type epoxy resin, a polyepoxy resin, a dimer acid type epoxy resin, a polyglycol type epoxy resin and the like can be used. These epoxy resins can be used alone or as mixtures comprising two or more thereof.

The epoxy resin used is not particularly limited, but generally has epoxy equivalents of from 70 to 1,000, preferably from 100 to 700.

Other resins which are compatible with the above epoxy resins include thermosetting and thermoplastic resins. Representative examples of the thermosetting resins are a phenoxy resin, a phenol resin, a xylene resin, an acrylic resin and an unsaturated polyester resin. Examples of the thermoplastic resins are a polyester resin, an ethylene-vinyl acetate copolymer, a thiocol resin, an ionomer resin, a modified butadiene-acrylonitrile resin, a vinyl acetate resin, coal such as coal tar and asphalt pitch, and a petroleum residue resin. One or more of those other resins can be used in combination with the above epoxy resin. Those other resins compatible with the epoxy resin can be used by replacing up to 50% by weight, preferably up to 30% by weight, of the epoxy resin.

The other blend system in the two-pack epoxy resin composition used in the present invention comprises a curing agent containing an underwater-curable curing agent capable of curing the epoxy resin even in water. In addition, additives such as a filler and a flowability adjusting agent as described above are compounded thereto depending on the purpose of use.

These additives are compounded in an amount up to 1,000 parts by weight, preferably from 1 to 500 parts by weight, per 100 parts by weight of the curing agent. A composition having a relatively high viscosity can be formed by increasing the amount of the filler added.

Curing agents for the epoxy resin which are sparingly soluble in water are replaceable with a water molecule, and active hydrogen can be used as the underwater-curable curing agent. Examples of the curing agent are amine-based curing agent such as aromatic amines, polyalkylenepolyamines, cyclic aliphatic polyamines, polyamideamines, modified polyamines, and keteimines; polymercaptans; and the like. Those are used alone or in combination with each other. In combination with the underwater-curable curing agent, cold-curable curing agents which are conventionally used in the atmosphere can be used. Examples of such cold-curable curing agents are aliphatic polyamines, polyamideamines, amine-containing adducts and separated adducts. The cold-curable curing agent is used by replacing up to 40% by weight, preferably up to 30% by weight, of the underwater-curable curing agent.

A metal powder which is contained in the composition for the formation of the first layer and having the ionization tendency larger than that of iron includes a zinc powder, an aluminum powder, a magnesium powder, a chromium powder, a zirconium powder, etc., powders of alloys of the above metals, and composite powders resulting from plating or vacuum deposition of the above metals. These metal powders can be used alone or in combination with each other. The composite powder is a powder wherein the surface of particles is composed of the above described metals. For example, the composite powder is obtained by coating the metals on the surface of metal powder (including iron) having the ionization tendency smaller than that of iron or the surface of synthetic resin powder by means of, for example, deposition. Use of such metal powders in combination greatly increases the adhesion of the epoxy-based resin to iron in water. Of those powders, a zinc powder and an aluminum powder are particularly preferred.

The metal powder of the present invention preferably has the average particle size of from 1 to 300 $\mu$m. If the average particle size is less than 1 $\mu$m, the effect of increasing underwater adhesion properties is insufficient. On the other hand, if the average particle size is more than 300 $\mu$m, a coating having a poor appearance is undesirably obtained. The shape of the particle may be any of shapes such as flat, spherical and needle-like and the effect of increasing underwater adhesion properties can be obtained regardless of the particle shape. The metal powder must be added in an amount of from 5 to 75 wt % based on the total weight of the two-pack resin blend system (including additives) and the metal powder. If the amount of the metal powder added is less than 5 wt %, the effect of increasing underwater adhesion properties cannot be obtained. On the other hand, if the amount of the metal powder added is more than 75 wt %, the cohesive force of the resulting composition and the adhesion force of the composition to a steel material are undesirably decreased.

The mixing proportion of the blend system comprising the epoxy resin and the blend system comprising the underwater-curable curing agent is generally such that the active hydrogen equivalent in the underwater curing agent component is from 0.2 to 2.0, preferably from 0.5 to 1.5, per equivalent of the epoxy group in the epoxy resin. If the proportion is too small, the curing rate becomes slow, and if the proportion is too large, the properties of the cured product deteriorate.

The metal powder can be previously incorporated in any one or both of the blend system comprising the epoxy resin and the blend system comprising the underwater-curable curing agent for the epoxy resin, or can be added at the time of mixing the blend system comprising the epoxy resin and the blend system comprising the underwater-curable curing agent for the epoxy resin.

The adhesion force to iron is an important factor for the first layer coating as an undercoating layer. For this reason, the metal powder-containing composition is essential, while on the other hand, coloring is limited due to the presence of the metal powder. Accordingly, the underwater-curable composition comprising the two-pack resin blend system and the coloring pigment is used as the second layer (overcoating layer). The underwater-curable composition does not substantially contain the metal powder. On the other hand, the coloring pigment can be added to the metal powder-containing composition used for the first layer coating, if desired. Further, the epoxy-based resin and the underwater-curable curing agent which constitute the metal powder-containing composition for the first layer coating can be the same as or different from those in the composition for the second layer coating.

All coloring pigments which are used in the conventional paints can be used as the coloring pigment for the preparation of the second layer coating composition. Examples thereof include oxide type coloring pigments such as chromium oxide, iron oxide and titanium dioxide, pigments such as carbon black and graphite, and organic coloring pigments such as phthalocyanine blue and phthalocyanine green. It is particularly preferred to add sparingly water-soluble pigments.

The coloring pigment can be added to any one or both of the blend system comprising the epoxy resin and the blend system comprising the underwater-curable curing agent. Where the coloring pigment is added to both the blend systems, pigments having different hues can be added to the respective blend system, so that a measure of extent of stirring when the two blend systems are mixed and stirred can be obtained.

The two-pack epoxy resin composition is constituted by the combination of the blend system comprising the epoxy resin (hereinafter referred to as a "main component") and the blend system comprising the underwater-curable curing agent (hereinafter referred to as a "curing agent"). The curing reaction proceeds by mixing the main component and the curing agent, resulting in the formation of an epoxy resin-based cured product. In connection with the properties of the two-pack epoxy resin composition, the main component and the curing agent are prepared in the form of a high viscosity composition (paste-like) or a low viscosity composition (paint-like; viscosity: about 3,000 ps or less) so that the composition can be mixed and coated by the wet hand method. Depending on the properties, the composition can be coated using, for example, a brush, a trowel, a spatula and a roller. Although the coating thickness varies depending on the viscosity and properties, coating is usually carried out such that the total thickness of the two coatings is from 100 $\mu$m to 10 mm. As the thickness of each layer, the first and second layer coating each generally has a thickness of from 50 $\mu$m to 8 mm.

In the practice of coating, rust, sea animals and the like on the steel surface in water are first removed by techniques such as a disc sander, a water jet and a sand water jet, the underwater-curable composition containing the metal powder is coated on the iron surface as the first layer, and the underwater-curable composition containing the coloring pigment is then coated thereon as the second layer. The second layer can be coated either after the first layer is cured or before the first layer is cured, i.e., the first layer is uncured. In accordance with the present invention in which an epoxy resin, a curing agent to cure the epoxy resin, and a metal powder having an ionization tendency greater than that of iron are used, the excellent coating properties and curing properties inherent in the epoxy resin can be maintained and, at the same time, due to the mutual action with the metal powder, underwater coating properties are excellent and underwater adhesion properties are greatly increased. Therefore, the composition applied is not lost by waves and the like and is cured as such, and the cured coating strongly adheres to an underwater steel structure because of its great adhesion force. Furthermore, since the cured coating possesses inherent excellent characteristics of the epoxy resin, the coating exhibits a quite excellent anticorrosion effect in combination with the above characteristics, and effectively protects the underwater structure. Furthermore, when the main component of the overcoating composition for the second layer is the same as or the similar type to that of the undercoating composition for the first layer, not only overcoating is extremely easy but also the adhesion properties between the layers after curing are excellent. In addition, the multilayer coating provides the advantage that coating defects such as pinholes are markedly decreased.

Further, in the second layer of the overcoating according to the present invention, a glass flake together with a coloring pigment can be added to the two-pack resin blend system. The glass flake is added to increase the anticorrosion effect. The glass flake comprises, as a main component, ones which pass the 32 mesh (500 μm) sieve and do not pass 350 mesh (45 μm) sieve (the sieves are defined according to JIS Z8801). The "main component" means at least 50% by weight, preferably at least 60% by weight and more preferably at least 70% by weight, based on the total weight of the glass flake.

Further, the glass flakes generally used in the present invention must all pass the 16 mesh (1,000 μm) sieve (as defined above).

The thickness of glass flake is preferably 0.5 to 10 μm.

The amount of glass flake added is 5 to 30% by weight, preferably 10 to 25% by weight, per the total weight of the composition.

By using the glass flake within the above described specific range, further excellent anticorrosion effect can be obtained.

Although the method of the present invention is a coating method in water, as a matter of course, it can be applied to wet surfaces such as splash zones and high and low tide zones of structures. Moreover, the method of the present invention can be applied to structures on the ground.

The present invention is described in greater detail by reference to the following Examples and Comparative Examples. Unless otherwise indicated, all percents, parts, ratios and the like are by weight.

EXAMPLES 1 TO 3 AND COMPARATIVE EXAMPLES 1 AND 2

90 Parts of a bisphenol A type epoxy resin having an epoxy equivalent of 185 to 192, 10 parts of phenyl glycidyl ether as a reactive diluent, 40 parts of calcium carbonate, and 2 parts of superfinely divided anhydrous silica (specific surface area: 200 m²/g) as a tag-preventing agent were mixed and stirred at 50° C. to prepare an epoxy resin blend system. On the other hand, 50 parts of modified aromatic polyamine having an active hydrogen equivalent of 95, 15 parts of calcium carbonate and 1 part of superfinely divided anhydrous silica (specific surface area: 200 m²/g) as a tag-preventing agent were mixed at 50° C. in a mixing vessel to prepare a curing agent blend.

142 g of the epoxy resin blend system and 66 g of the curing agent blend were weighed, and a zinc powder (average particle diameter: 50 μm) was added in the proportions shown in Table 1 below and mixed to prepare undercoating compositions 1, 2, 3, 4 and 5 used for the formation of the first layer.

TABLE 1

|  | Undercoating Composition (parts) | | | | |
|---|---|---|---|---|---|
|  | 1 | 2 | 3 | 4 | 5 |
| Epoxy Resin Blend System | | | | | |
| Bisphenol A Type Epoxy Resin | 90 | 90 | 90 | 90 | 90 |
| Reactive Diluent | 10 | 10 | 10 | 10 | 10 |
| Calcium Carbonate | 40 | 40 | 40 | 40 | 40 |
| Tag-Preventing Agent | 2 | 2 | 2 | 2 | 2 |
| Curing Agent Blend System | | | | | |
| Modified Aromatic Polyamine | 50 | 50 | 50 | 50 | 50 |
| Calcium Carbonate | 15 | 15 | 15 | 15 | 15 |
| Tag-Preventing Agent | 1 | 1 | 1 | 1 | 1 |
| Metal Powder | | | | | |
| Zinc Powder | 23.1 (10)* | 208 (50)* | 485 (70)* | 2.1 (1)* | 832 (80)* |

The numerical values in ( )* represent weight % of the zinc powder in the blend system.

The overcoating composition used for the formation of the second layer was prepared by adding titanium oxide as a coloring pigment to the epoxy resin blend system and phthalocyanine blue B as a coloring pigment to the curing agent blend system and then mixing the respective compositions in a mixing vessel at 50° C. in the same manner as in the preparation of the undercoating composition. Each mixing proportion (parts) is shown in Table 2.

TABLE 2

| Epoxy Resin Blend System | |
|---|---|
| Bisphenol A Type Epoxy Resin | 90 |
| Reactive Diluent Phenyl Glycidyl Ether | 10 |
| Coloring Pigment, Titanium Oxide | 5 |
| Calcium Carbonate | 40 |
| Tag-Preventing Agent, Superfinely Divided Anhydrous Silica (specific surface area: 200 m²/g) | 2 |
| Curing Agent Blend System | |
| Modified Aromatic Polyamine | 50 |
| Coloring Pigment, Phthalocyanine Blue B | 1 |
| Calcium Carbonate | 15 |
| Tag-Preventing Agent, Superfinely Divided Anhydrous Silica (specific surface area: 200 m²/g) | 1 |

An SS 41 steel plate (9×100×100 mm) which had been ground with a disc sander was dipped in sea water for 4 hours as a material to be coated. The compositions 1, 2, 3, 4 and 5 shown in Table 1 each was coated in the sea with a spatula. After 30 hours, the overcoating composition was coated with a roller as the second layer.

The thickness of the first layer was about 200 μm and the thickness of the second layer was about 200 μm, and the total thickness was about 400 μm. Coating workability at the time of coating, the appearance of the coated surface after coating, and the adhesion force of the coating after curing are shown in Table 3.

TABLE 3

| | | Coating Workability of Undercoating Composition* | Appearance of Coating | Adhesion Force of Coating after 1 Month after Curing in Water** (kg/cm$^2$) |
|---|---|---|---|---|
| Example 1: | Undercoating Composition 1 + Overcoating Composition | o | Good | 17 |
| Example 2: | Undercoating Composition 2 + Overcoating Composition | o | Good | 25 |
| Example 3: | Undercoating Composition 3 + Overcoating Composition | o | Good | 28 |
| Comparative Example 1: | Undercoating Composition 4 + Overcoating Composition | x | Poor | 3 |
| Comparative Example 2: | Undercoating Composition 5 + Overcoating Composition | Δ | Poor | 5 |

*o: The whole surface can be uniformly coated easily with a spatula several times.
Δ: When overcoating is carried out, the first coating sometimes separates, but the whole surface can be coated by repeating coating with a spatula.
x: Separation from the steel surface occurs even if overcoating is repeated, and the whole surface cannot be coated.
**Adhesion Pull-Off Test A coated sample which had been dipped in sea water for 1 month was taken out in the air and dried over 1 day and night. This coated sample was measured for adhesion force using an adhesion tester.

EXAMPLE 4

Example 1 was repeated except that an aluminum powder (average particle diameter: 15 μm) was used in place of the zinc powder.

The results obtained are shown in Table 4 below.

EXAMPLE 5

Example 2 was repeated except that a zirconium powder (average particle diameter: 20 μm) was used in place of the zinc powder in the undercoating composition.

The results obtained are shown in Table 4 below.

EXAMPLE 6

Example 3 was repeated except that a chromium powder (average particle diameter: 60 μm) was used in place of the zinc powder in the undercoating composition.

The results obtained are shown in Table 4 below.

EXAMPLE 7

Example 1 was repeated except that composite particles prepared by coating the surface of glass beads (average particle diameter: 60 μm) with aluminum in an average thickness of 1 μm was used in place of the zinc powder in the undercoating composition.

The results obtained are shown in Table 4 below.

COMPARATIVE EXAMPLE 3

Example 1 was repeated except that 120 parts of titanium white was used in place of the zinc powder in the undercoating composition.

The results obtained are shown in Table 4 below.

TABLE 4

| | Coating Workability of Undercoating Composition* | Appearance of Coating | Adhesion Force of Coating after 1 Month after Curing in Water** (kg/cm$^2$) |
|---|---|---|---|
| Example 4 | o | Good | 15 |
| Example 5 | o | Good | 20 |
| Example 6 | o | Good | 22 |
| Example 7 | o | Good | 20 |
| Comparative Example 3 | x | Poor | 2 |

* and **The same as defined in Table 3.

EXAMPLE 8

Example 2 was repeated except that 30 parts of a cyclic aliphatic polyamine (isophoronediamine-modified product) having an active hydrogen equivalent of 110 was used in place of the modified aromatic polyamine in the undercoating composition.

The results obtained are shown in Table 5 below.

EXAMPLE 9

Example 2 was repeated except that 100 parts of a cyclic aliphatic polyamine (isophoronediamine-modified product) having an active hydrogen equivalent of 110 was used in place of the modified aromatic polyamine in the undercoating composition.

The results obtained are shown in Table 5 below.

EXAMPLE 10

Example 2 was repeated except that a bisphenol F-type epoxy resin (epoxy equivalent: 175) was used in place of the bisphenol A-type epoxy resin in the undercoating composition.

The results obtained are shown in Table 5 below.

EXAMPLE 11

Example 2 was repeated except that a glycidyl phthalate-type epoxy resin (epoxy equivalent: 140) was used in place of the bisphenol A-type epoxy resin in the undercoating composition.

The results obtained are shown in Table 5 below.

EXAMPLE 12

Example 1 was repeated except that the thickness of the first layer was 100 μm, the thickness of the second layer was 100 μm, and the total thickness thereof was 200 μm.

The results obtained are shown in Table 5 below.

EXAMPLE 13

Example 3 was repeated except that the thickness of the first layer was 5 mm, the thickness of the second layer was 3 mm, and the total thickness thereof was 8 mm, and that the second layer coating was conducted using a spatula.

The results obtained are shown in Table 5 below.

EXAMPLE 14

Example 2 was repeated except that calcium carbonate was not used in the undercoating composition and the overcoating composition.

The results obtained are shown in Table 5 below.

EXAMPLE 15

Example 1 was repeated except that barium sulfonate was used in place of calcium carbonate in the undercoating composition, 200 parts of basrium sulfonate was added to the epoxy resin blend system, 100 parts of barium sulfonate was added to the curing agent blend system, and the amount of the zinc powder was 40 parts.

The results obtained are shown in Table 5 below.

EXAMPLE 16

Example 2 was repeated except that diethylene glycol diacrylate (acrylic resin) was used in place of phenylglycidyl ether (reactive diluent) in the undercoating composition.

The results obtained are shown in Table 5 below.

EXAMPLE 17

Example 2 was repeated except that 10 parts of coal tar was added to the undercoating composition.

The results obtained are shown in Table 5 below.

EXAMPLE 18

Example 2 was repeated except that 10 parts of bisphenol A-type epoxy resin (epoxy equivalent: 500) was added to the undercoating composition.

The results obtained are shown in Table 5 below.

TABLE 5

| | Coating Workability of Undercoating Composition* | Appearance of Coating | Adhesion Force of Coating after 1 Month after Curing in Water** (kg/cm$^2$) |
|---|---|---|---|
| Example 8 | o | Good | 17 |
| Example 9 | o | " | 20 |
| Example 10 | o | " | 25 |
| Example 11 | o | " | 16 |
| Example 12 | o | " | 18 |
| Example 13 | o | " | 25 |
| Example 14 | o | " | 22 |
| Example 15 | o | " | 16 |
| Example 16 | o | " | 15 |
| Example 17 | o | " | 17 |
| Example 18 | o | " | 18 |

* and **The same as defined in Table 3.

EXAMPLE 19

Example 1 was repeated except that the total amount of calcium carbonate used in the overcoating composition was replaced by the same amount (weight) of a glass flake (thickness: 3 μm, all 16 mesh pass, the proportion of 32 mesh pass and 350 mesh not pass; 75 wt %).

The adhesion forces after 1 month and 12 months after curing in water were measured.

The results obtained are shown in Table 6 below.

EXAMPLE 20

Example 1 was repeated except that the total amount of calcium carbonate used in the curing agent blend system of the overcoating composition was replaced by the same glass flake as used in Example 19.

The results obtained are shonw in Table 6 below.

EXAMPLE 21

Example 2 was repeated except that the total amount of calcium carbonate used in the overcoating composition was replaced by the same glass flake as used in Example 19.

The results obtained are shown in Table 6 below.

EXAMPLE 22

Example 3 was repeated except that the total amount of calcium carbonate used in the overcoating composition was replaced by the same glass flake as used in Example 19.

The results obtained are shown in Table 6 below.

TABLE 6

| | Coating Workability of Undercoating Composition* | Appearance of Coating | Adhesion Force after Curing in Water** | |
|---|---|---|---|---|
| | | | After 1 Month (kg/cm$^2$) | After 12 Months (kg/cm$^2$) |
| Example 19 | o | Good | 17 | 17 |
| Example 20 | o | " | 17 | 17 |
| Example 21 | o | " | 25 | 25 |
| Example 22 | o | " | 28 | 28 |

* and **The same as defined in Table 3.

While the invention has been described in detail and with reference to specific embodiments thereof, it will be apparent to one skilled in the art that various changes and modifications can be made therein without departing from the spirit and scope thereof.

What is claimed is:

1. A method for coating steel structures in water which comprises
   coating as a first layer an underwater-curable composition comprising
   (1) a two-pack resin blend system comprising
     (a) a blend system comprising an epoxy-based resin, and
     (b) a blend system comprising an underwater-curable curing agent capable of hardening the epoxy-based resin blend system, and
   (2) from 5 to 75% by weight, based on the total weight of the underwater-curable composition, of a metal powder having an ionization tendency greater than that of iron,
   on the steel structures, and
   coating an underwater-curable composition comprising the two-pack resin blend system but not containing the metal powder, a coloring pigment and a glass flake on the first layer as a second layer.

2. A method as in claim 1, wherein said glass flake is added in an amount of 5 to 30% by weight per the total weight of the composition.

3. A method as in claim 2, wherein the amount of the glass flake is 10 to 25% by weight.

4. A method as in claim 1, wherein the glass flake comprises, as a main component, glass flakes which pass the 32 mesh (500 μm) sieve and do not pass 350 mesh (45 μm) sieve (the sieve being defined according to JIS Z8801).

5. A method as in claim 4, wherein said glass flakes all pass the 16 mesh (1,000 μm) sieve.

6. A method as in claim 1, wherein said glass flake has a thickness of 0.5 to 10 μm.

7. A method as in claim 1, wherein the first and second layer each has a thickness of 50 μm and 8 mm.

8. A method as in claim 7, wherein the total thickness of the first and second layers in 100 μm to 10 mm.

* * * * *